United States Patent [19]

Severson et al.

[11] 4,331,036
[45] May 25, 1982

[54] FLUID FLOWMETER

[75] Inventors: Asbjorn M. Severson, Minneapolis; John A. Volk, West St. Paul, both of Minn.

[73] Assignee: Honeywell Inc., Minneapolis, Minn.

[21] Appl. No.: 204,417

[22] Filed: Nov. 6, 1980

[51] Int. Cl.³ .......................... G01F 1/70; G01F 3/00
[52] U.S. Cl. .................................... 73/861.05; 73/255
[58] Field of Search ................ 73/861.05, 861.32, 255

[56] References Cited

U.S. PATENT DOCUMENTS 4,118,980 10/1978 Debeaux ........................... 73/861.05
4,157,660 6/1979 Spacek .................................. 73/255
4,203,323 5/1980 Thorssell .............................. 73/255

Primary Examiner—Herbert Goldstein
Attorney, Agent, or Firm—Charles G. Mersereau

[57] ABSTRACT

A follower element flowmeter which includes a hollow enclosed toroidal path around which a follower element travels in response to a flowing fluid. A pair of sensors are located adjacent to the fluid inlet and outlet to sense the passage of the follower element. The transit times of the follower element from inlet to outlet and from outlet to inlet is determined. The internal torus is described by juxtaposed housing halves one of which contains the fluid inlet and one, the fluid outlet. The halves are constructed so as to be relatively rotatable such that the distance between the inlet and outlet may be varied to adjust the calibration of the flowmeter.

7 Claims, 3 Drawing Figures

FLUID FLOWMETER

BACKGROUND OF THE INVENTION

1. Field of the Invention

The present invention relates generally to the field of volumetrically measuring the flow of fluids through a conduit and, more particularly, to an adjustable ball-type follower flowmeter which can be readily calibrated to a standard curve.

2. Description of the Prior Art

The prior art is repleat with numerous types of flowmetering devices for measuring the flow of fluids through pipelines or the like. Many of these flowmeters either utilize some type of spinning element or a follower element such as a ball which follows a track. In meters employing a spinning element, typically the element includes several arms or paddles which interact with the fluid flowing through the meter to produce rotation of the element. The rate of rotation is measured as a function of the flow rate through the meter. Such devices are expensive, difficult to assemble, and are subject to a great deal of maintenance because of the complex element structure including the necessity for a low friction mounting in the housing.

Follower element flowmeters of the ball type are also generally known in the prior art. These devices usually have a housing containing a ball race in the form of a circular toroidal cavity having fixed inlet and outlet ports which may be tangential to the race and through which all of the fluid to be measured flows. The ball is driven along the path by the fluid and the passage of the ball is sensed at one or more fixed points along the path. The speed at which the ball travels or revolves is proportional to the volume rate of fluid flow through the meter and thus the frequency at which the ball passes the sensing point or points is also proportional to the volume rate of flow through the meter. Because the fluid volume displaced between sensing points is known, each sensing of the ball defines a known incremental fluid volume which can be used to determine the total volumetric flow rate.

One example of such a device is shown in U.S. Pat. No. 4,157,660. That device has tangential inlet and outlet ports in opposed relationship on opposite sides of the toroid and a single photoelectric or magnetic pickup device to detect the frequency of revolution of the ball. In order to achieve accuracy over a range of flow rates with that device, the inlet flow is provided with a metering orifice and if flow is to be measured in either direction, both the inlet and the outlet ports must be provided with a metering orifice.

Another prior art device is shown in U.S. Pat. No. 4,203,323. That device utilizes a plurality of sensors along the path to decrease the incremental volume and therefore increase the accuracy of the incremental volume measured. In addition, to overcome inherent non-linearities in that device, a programmed memory unit is provided which compares the signal repetition rate with stored data representing the fluid volume passing through the flowmeter per signal as a function of the signal repetition rate to produce the correct volume flow rate in accordance with a previous calibration.

As can be seen from the above, the basic premise of the follower-element flowmeter is that there be a direct linear proportionality between the volume flow rate and the rotational repetition of the follower element over the range of flow rates sought to be measured. In reality, certain configurations appear to be more linear than others and within a group of meters of a given type, the accuracy may depend upon the repeatable precision of parts and assembly. As can be seen from the prior art cited, much of the innovation in a field has been directed toward overcoming various inaccuracies in the flowmeters which are present for known and unknown reasons.

The requirement of utilizing such devices as precise metering orifices or individually calibrated microprocessors to correct actual readings have been necessary. While these approaches generally increase the accuracy of the flowmeters, they increase the complexity and the cost of the flowmeters sometimes to the point where any advantage gained by the simplicity of the device may be lost.

SUMMARY OF THE INVENTION

The present invention contemplates a simple, low-cost follower-element flowmeter which eliminates the need for expensive additional parts, highly accurate machining, or individualized calibrated memories to achieve a linearity and accuracy sufficient for most flowmeter applications. By means of the present invention, this can be achieved at a great cost saving over prior art devices. According to the present invention, it has been found that accuracy can be generally standardized in a given meter configuration by constructing the meter such that the relative positions of the inlet and outlet may be physically varied rather than fixing the configuration of the meter physically in attempting to compensate for idiosyncrasies by other means. In the preferred embodiment of the present invention, juxtaposed, opposite hand meter halves are provided, one of which contains the inlet port and the other the outlet port and each of which is provided with a recess such that when the two halves are combined, a toroidal path is provided having an inlet on one half and an outlet on the other. At least one sensor is provided on each half opposite the respective inlet or outlet. This allows one half to be rotated relative to the other thereby changing the relative position of the inlet and outlet ports and, at the same time, the linear path distance between the sensors.

Experimentation has shown that the speed of the ball in its path around the track is not constant. The path may be defined as having two segments—that from inlet to outlet and that from outlet to inlet. Thus, the velocity of the ball has been observed to be somewhat higher as it traverses that portion of the toroidal path between the inlet and outlet as this is the portion which comprises the shortest path for the fluid as it flows through the meter. Other velocity differences are introduced because of imperfections in the surface of the ball or the race. While these inaccuracies can be eliminated, at least in part, by precision machining of the parts involved, this, of course, introduces added cost to the system.

According to the present invention, it has been found that many of the individual idiosyncracies of the meters of the type described can be eliminated by providing the ability to vary the distance between the inlet and outlet along with the distance between the ball detectors. Thus, by providing simple calibration, all such meters can be linearized to the same function. Upon assembly of the two halves comprising the metering section of the present invention, the device may be simply calibrated by subjecting it to a known volumetric flow and simply rotating one half relative to the other until the meter readout corresponds to the known flow. It has been found that once this is done, the readout of the meter will correspond to other points along the function such that it will achieve an accuracy sufficient for most applications.

The pair of sensors provided may be of any type compatible with the materials of construction and the type of fluid to be measured. Such device may be optical, electromagnetic, or electrodielectric, for example. Also, the readout means may be any well known means for counting signals and relating them to given incremental measurements. This aspect of the system is well known in the art.

BRIEF DESCRIPTION OF THE DRAWINGS

In the drawings wherein like numerals are utilized to denote like parts throughout the same.

DETAILED DESCRIPTION

Figure 1:
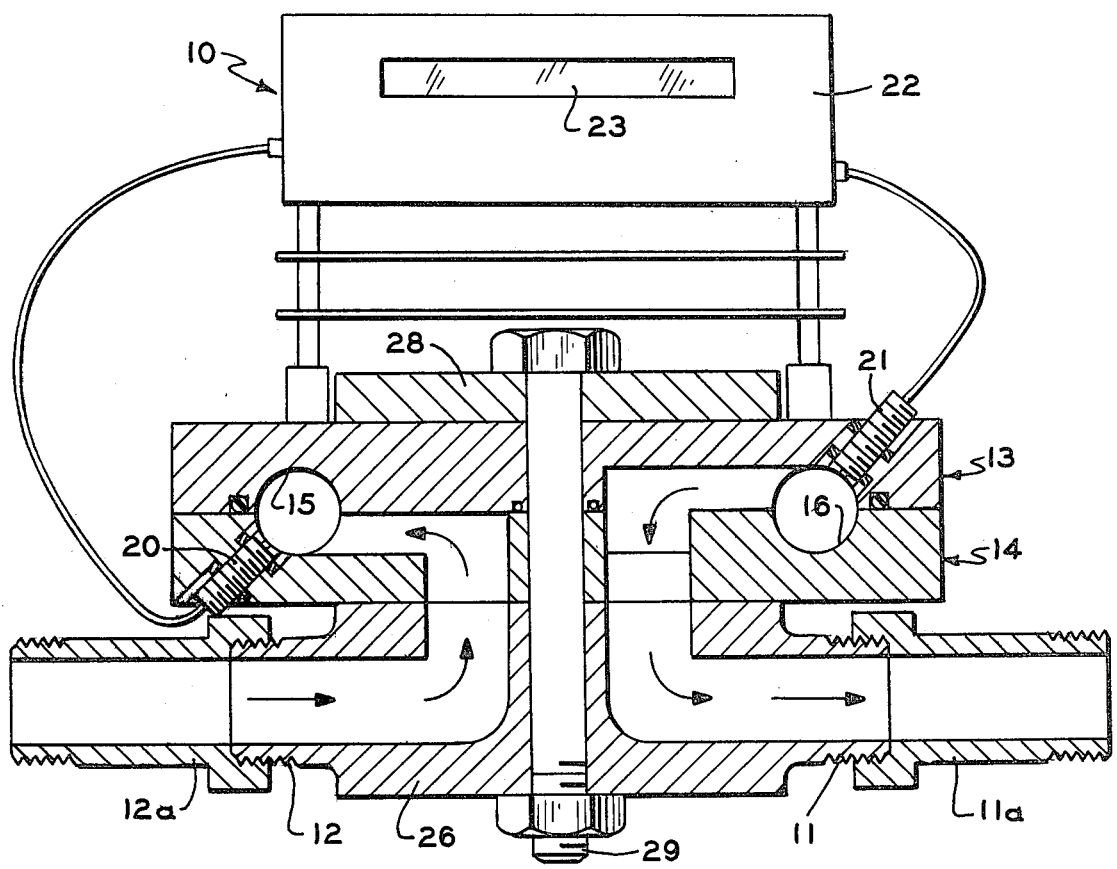
FIG. 1 is a vertical elevational view partially in section through an assembled embodiment of the flowmeter of the invention.

FIG. 1 depicts an embodiment of a flowmeter in accordance with the present invention shown partially in section such that the interior details may be described. Thus, the flowmeter is shown generally at 10 having inlet and outlet threaded portions 12 and 11 adapted to mount the flowmeter into an existing pipeline, or the like, as at 11a and 12a the flow through which is to be measured. The housing includes upper and lower housing halves 13 and 14 containing recesses 15 and 16 which, when assembled in superimposed fashion, combine to form a hollow toroid. As illustrated and better seen in FIG. 2, the lower section 14 contains the inlet port 17 and the upper section 13, the exit port 18. The follower element 19, which may be a ball, is illustrated in the lower half at 19. The passage of the ball past inlet 17 and outlet 18 is sensed by the sensors depicted at 20 and 21 which in conjunction with the digital meter or other such device 22 produce the desired readout at 23.

It should be noted that an elongated radial slot 24 is provided in the lower segment 14 such that the exit port 18 remains in communication with the base exit port 25 when the position of the segment 13 is rotated relative to segment 14. Because the lower segment 14 remains fixed relative to the base member 26, the base port 27 is always in communication with the inlet 17. The assembly is held rigidly together as by retainer plate 28 which is held by central retainer bolt 29.

Figure 2:
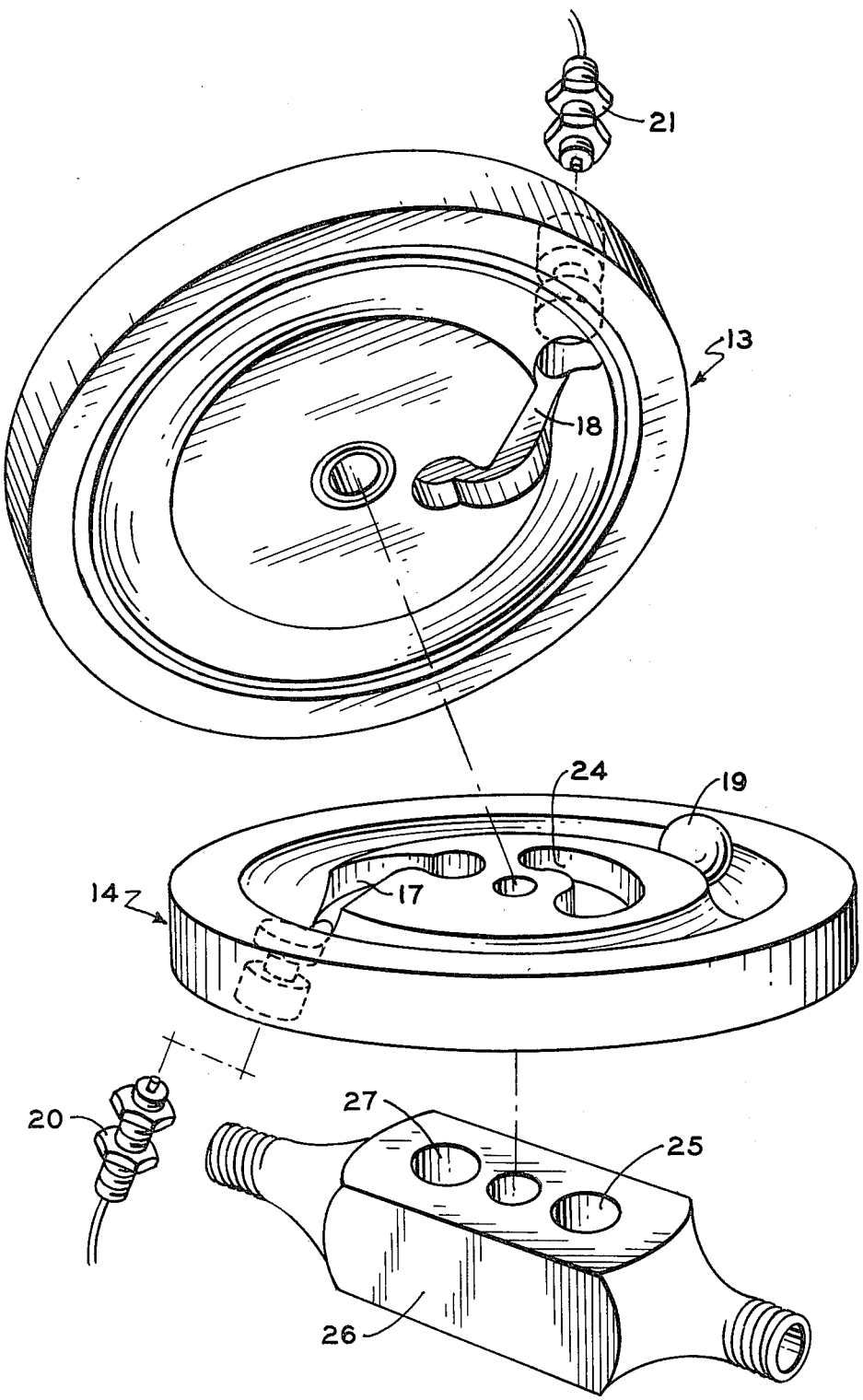
FIG. 2 is an exploded view of the flowmeter of FIG. 1.

As may be noted from FIG. 2, the inlet and outlet ports 17 and 18 are normally arranged approximately 180° apart and are angled to provide a preferred direction for the fluid stream. It is not necessary, however, that these entry and exit ports be tangential to the toroidal path. Follower or ball 18 should be of a shape and size which closely fits the toroidal path and which nearly matches the fluid density such that it is able to move easily with the fluid in the meter without appreciable leakage past the sphere in the meter.

Sensors 20 and 21 may be any type of optical or electronic sensors which are compatible with the materials of construction and the fluid sought to be metered. In one successful embodiment, a metal-containing sphere or ball was used in conjunction with a pair of Honeywell type FY-metal sensitive proximity switched manufactured by Honeywell Inc. Micro Switch Division, Freeport, Ill. The sections 13 and 14 for that model were molded from an epoxy plastic resin to prevent interference between any metals and the proximity switches. Of course, the proximity switches may be shielded from other metals present if such are used and from the pipes and the pipe connecting base section 26.

As can be seen from FIGS. 1 and 2, in normal operation, the fluid enters from the pipe or conduit through the opening 27 and the inlet port 17 and exits through the outlet port 18 leading back to the pipe or conduit through the base port 25. Of course, some of the fluid must totally circumvent the toroid, thereby causing the ball or sphere 19 to rotate. In regard to this phenomenon, it has been found that a relatively large percentage of the fluid passes directly in and out without circumventing the entire toroidal track. However, a small percentage flows on from the outlet back to the inlet and rejoins the main flow. Thus, an examination of the entire flow through the meter shows that the flow between the inlet and outlet is thus augmented by this "parasitic" or leakage flow. The total flow about the toroidal path includes both the parasitic flow and the actual flow between the inlet and outlet sought to be measured. The parasitic flow or recirculation flow is caused by the fluid velocity increase due to any entry restriction and is responsible for a major portion of the pressure drop in a device of this type. Thus, recirculation flow must be accounted for and subtracted from the total flow in order to achieve an accurate metered reading.

According to the present invention, it has been found that if the transit times of the ball or sphere from inlet to outlet and from outlet to inlet is measured, a ratio therebetween may be established. The time ratio and total number of ball transits may be used to calculate the net or actual flow in relation to the mechanical dimensions of the toroid. The ball, of course, moves at a slightly higher speed moving from the inlet to the outlet than from the outlet to the inlet. It has been found that if the ball is of such a specific gravity and size that it flows readily with the fluid stream and virtually fills the cross section of the toroid, leakage past the ball is substantially reduced such that in normal operation, it may be assumed to be zero. This allows the net flow to be readily determined from the high speed and low speed ball transit times. Utilizing the above discovery, the following basic formula has been verified experimentally for an incompressible fluid:

$$\text{Volume Flow} = RA\theta NT_L \left( \frac{1}{T_s} - \frac{1}{T_L - T_s} \right)$$

Where
R = toroid radius
A = toroid cross-sectional area
$\theta$ = angle between nozzles (radians)
$T_L$ = total time of test
$T_s$ = total time of high speed loop
N = total number of ball revolutions As noted from the above, the ball flowmeter of the present invention is designed with the inlet port in one half of the structure and the outlet in the other half. It is further noted that the halves are free to rotate relative to one another via loosening the bolt 29. This permits adjustment of the relative high and low speed path length by adjusting the angle $\theta$ between nozzles by simply rotating the upper half relative to the lower half. Experimentation has shown that the configuration of the present invention is substantially linear at all but the lowest flow rates. In fact, success has been found utilizing but a single calibration curve and by calibrating a given meter to a point on the calibration curve. At a given flow rate, the meter maintains the linearity of the calibration curve at all but the lowest flow rate. This enables quick, easy calibration of the flowmeter in accordance with the invention and at the point of calibration, the halves can be fixed relative to each other such that accuracy is maintained.

This quick, simple method of calibration allows the meter parts to be substantially mass produced without the need of expensive precision parts as individual meters can be readily calibrated to a standard curve. In addition, the elimination of entry and exit nozzles and the like reduces the pressure drop across the meter, thereby reducing the undesirable pressure loss in the line.

Figure 3:
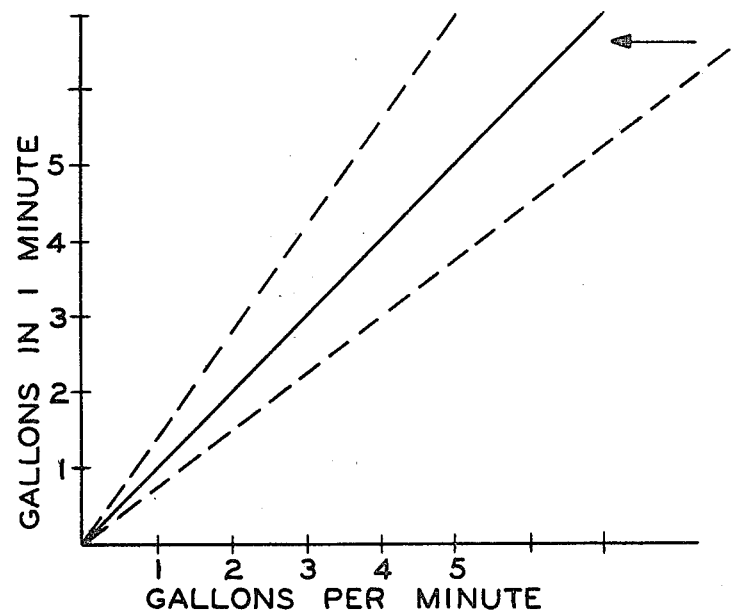
FIG. 3 is a calibration plot of the flowmeter in accordance with the present invention.

FIG. 3 shows a typical calibration curve for a meter of the type described. It should be noted that for a given number of meters of a given size, the slope of the curve before calibration varies. Rotation of the upper half relative to the lower half which establishes a point on the calibration curve also establishes the accuracy of the readout through the origin.

As can be seen from the above, the follower-type fluid flowmeter of the present invention realizes a simple, inexpensive construction for this type of device which does not require precision orifices or the like. Accuracy of the meter is sufficient for all but the most precise applications wherein extremely accurate flow at low flow conditions is required.

The embodiments of the invention in which an exclusive property or right is claimed are defined as follows:

1. An apparatus for volumetrically measuring the flow of a fluid in a line comprising:
   a housing having a fluid inlet and fluid outlet;
   a chamber defined within said housing in the shape of a hollow torus in fluid communication with the fluid inlet and fluid outlet;
   a single follower element of similar cross-section shape to the torus cross-section but of slightly smaller dimension than that of the torus disposed therein such that it is free to move along the toroidal path;
   detection means for detecting the passage of the follower element at at least two points along the toroidal path wherein one such point is located adjacent to the fluid inlet and one such point is located adjacent said fluid outlet, said detection means including means for generating signals indicative of the passage of the follower element at each of said points; and
   signal processing means relating the time intervals between the detections of the follower element to the flow of the flowmeter.

2. The apparatus of claim 1 further comprising means for adjusting the relative positions of said fluid inlet and said fluid outlet along said toroidal path to increase or decrease the distance therebetween.

3. The apparatus of claim 2 wherein said torus is defined by a combination of recesses in juxtaposed members and wherein one of said juxtaposed members includes a recess defining inlet and the other one of said juxtaposed members includes a recess defining an outlet.

4. The apparatus of claim 3 wherein the relative positions of the inlet and the outlet may be adjusted by rotating one of said juxtaposed members with respect to the other.

5. The apparatus of claim 1 wherein said means for detecting the passage of the follower element comprises a pair of proximity detecting means one located adjacent to said inlet and one located adjacent to said outlet.

6. The apparatus of claim 1 wherein the follower element is a ball.

7. The apparatus of claim 1 wherein the follower element has a density approximately the same as that of the fluid to be metered.

* * * * *